(12) United States Patent
Kang et al.

(10) Patent No.: US 10,152,774 B2
(45) Date of Patent: Dec. 11, 2018

(54) METHOD AND SYSTEM FOR ESTIMATING POINT SPREAD FUNCTION

(71) Applicants: Tsinghua University, Beijing (CN); Nuctech Company Limited, Haidian (CN)

(72) Inventors: Kejun Kang, Beijing (CN); Zhiqiang Chen, Beijing (CN); Yuanjing Li, Beijing (CN); Li Zhang, Beijing (CN); Ziran Zhao, Beijing (CN); Yaohong Liu, Beijing (CN); Jianping Gu, Beijing (CN); Zhiming Wang, Beijing (CN)

(73) Assignees: Tsinghua University, Beijing (CN); Nuctech Company Limited, Haidian (CN)

( * ) Notice: Subject to any disclaimer, the term of this patent is extended or adjusted under 35 U.S.C. 154(b) by 252 days.

(21) Appl. No.: 15/217,613

(22) Filed: Jul. 22, 2016

(65) Prior Publication Data
US 2017/0024862 A1    Jan. 26, 2017

(30) Foreign Application Priority Data

Jul. 23, 2015    (CN) .......................... 2015 1 0437211

(51) Int. Cl.
*G06K 9/00*    (2006.01)
*G06T 5/00*    (2006.01)
(Continued)

(52) U.S. Cl.
CPC ............... *G06T 5/003* (2013.01); *G06T 7/44* (2017.01); *G06T 7/77* (2017.01); *G06T 2207/10116* (2013.01); *G06T 2207/20076* (2013.01)

(58) Field of Classification Search
CPC .. G06T 5/003; G06T 7/44; G06T 7/77; G06T 2207/10116; G06T 2207/20076
See application file for complete search history.

(56) References Cited

U.S. PATENT DOCUMENTS 9,779,491 B2 * 10/2017 Tezaur ...................... G06T 5/20
9,916,656 B2 *  3/2018 Choi ..................... G06T 7/0012
(Continued)

FOREIGN PATENT DOCUMENTS

CN    101291391 A    10/2008
CN    101354307 A    1/2009
(Continued)

OTHER PUBLICATIONS

International Search Report and Written Opinion dated Sep. 20, 2016 in PCT/CN2016/090336 (11 pgs), as well as English-language translation of the ISR (2 pgs); 13 pages total.

*Primary Examiner* — Aaron W Carter
(74) *Attorney, Agent, or Firm* — Knobbe, Martens, Olson & Bear, LLP

(57) ABSTRACT

The present disclosure relates to a method and device for estimating a point spread function. In one implementation, a method includes capturing, by a scanning device, an image by scanning a plurality of rectangle blocks which are same sized and closely arranged, wherein the plurality of rectangle blocks are made of different materials and/or have different mass thicknesses, and an incident direction of rays is perpendicular to a scanning direction and a surface of the plurality of rectangle blocks arranged closely during scanning; obtaining line spread functions for two directions along a length side and a width side of each of the rectangle blocks based on the scanned image, and obtaining standard deviation parameters of the line spread functions; and combining the standard deviation parameters for the two directions to obtain a two dimensional Point Spread Function (PSF) parameter so as to estimate the point spread function.

20 Claims, 6 Drawing Sheets

(51) Int. Cl.
    *G06T 7/77*         (2017.01)
    *G06T 7/44*         (2017.01)

(56) References Cited

U.S. PATENT DOCUMENTS

| | | | |
|---|---|---|---|
| 2006/0104410 A1* | 5/2006 | Sauer | A61B 6/032 |
| | | | 378/4 |
| 2009/0290682 A1* | 11/2009 | Star-Lack | G06T 11/005 |
| | | | 378/87 |
| 2010/0080487 A1* | 4/2010 | Yitzhaky | G06T 5/003 |
| | | | 382/266 |
| 2010/0231732 A1* | 9/2010 | Baxansky | G06T 5/003 |
| | | | 348/208.4 |
| 2014/0050380 A1* | 2/2014 | Song | G06T 11/003 |
| | | | 382/131 |
| 2016/0019678 A1* | 1/2016 | Cecil | A61B 6/5258 |
| | | | 382/132 |
| 2016/0048952 A1* | 2/2016 | Tezaur | G06T 5/004 |
| | | | 382/255 |
| 2017/0024862 A1* | 1/2017 | Kang | G06T 5/003 |
| 2017/0209112 A1* | 7/2017 | Yi | A61B 6/5264 |
| 2017/0262976 A1* | 9/2017 | Choi | G06T 7/0012 |
| 2017/0365046 A1* | 12/2017 | Tezaur | G06T 5/20 |

FOREIGN PATENT DOCUMENTS

| | | |
|---|---|---|
| CN | 102819830 A | 12/2012 |
| CN | 103927740 A | 7/2014 |

* cited by examiner

METHOD AND SYSTEM FOR ESTIMATING POINT SPREAD FUNCTION

CROSS-REFERENCE TO RELATED APPLICATIONS

The application bases on and claims priority to Chinese Patent Application No. 201510437211.6, filed Jul. 23, 2015, published as CN 106372035A, which are incorporated herein by reference in entirety.

BACKGROUND

Field

The disclosure relates to the technical field of perspective imaging, in particular, to a method and a system for estimating a point spread function.

Description of Related Information

In a perspective imaging system, an image is likely to be blurry due to movement of a scanning device and crosstalk of detectors, which have impacts on visual effects of the image, observation of the image and finding of suspicious areas from the image by an inspector. Image quality degradation of the system can be approximated as a convolution of a point spread function (PSF) to the image. The image can be deblurred by some image restoration technologies so as to get a clear image if the PSF was known. In addition, the quantitative description of the PSF can be used as an important index evaluating the imaging quality of the system, and a suggestion from deeply analyzing the PSF may be provided to improve software and hardware of the system.

The PSF is required to be estimated to improve image quality and analyze the reasons of image degradation. Most of the existing estimating approaches, such as the typical Cepstrum Approach, the Variational Bayesian Approach, the Sparsity Constrained Optimization Approach, etc., are used for a visible light imaging system. These approaches are used for common images and have poor estimation accuracy without specific devices, and most of them have slow computation speed. Some parameters of a testing device and system, such as width of a slit, radius of a hole, physical size of a detector, etc., should be known accurately for the approaches used in an X-ray imaging system. If the testing device is improperly designed or has low processing precision, an inaccurate estimation and a complex computing process will be occurred readily.

OVERVIEW OF SOME ASPECTS

According to a first aspect, a method for estimating point spread function is provided. The method includes: capturing, by a scanning device, an image by scanning a plurality of rectangle blocks which are same sized and closely arranged, wherein the plurality of rectangle blocks are made of different materials and/or have different mass thicknesses, and an incident direction of rays is perpendicular to a scanning direction and a surface of the plurality of rectangle blocks arranged closely during scanning; obtaining line spread functions for two directions along a length side and a width side of each of the rectangle blocks based on the scanned image, and obtaining standard deviation parameters of the line spread functions; and combining the standard deviation parameters for the two directions to obtain a two dimensional Point Spread Function (PSF) parameter so as to estimate the point spread function.

According to a second aspect, a system for estimating a point spread function is provided. The system includes: an imaging unit configured to capture, by a scanning device, an image by scanning a plurality of rectangle blocks which are same sized and closely arranged, wherein the plurality of rectangle blocks are made of different materials and/or have different mass thicknesses, and an incident direction of rays is perpendicular to a scanning direction and a surface of the plurality of rectangle blocks arranged closely during scanning; a parameter obtaining unit configured to obtain line spread functions for two directions along a length side and a width side of each of the rectangle blocks based on the scanned image, and obtain standard deviation parameters of the line spread functions; and an estimating unit configured to combine the standard deviation parameters for the two directions to obtain a two dimensional Point Spread Function (PSF) parameter so as to estimate the point spread function.

According to a third aspect, an image processing system for an X-ray imaging device is provided. The system comprises a radiation source, a detector, rectangle blocks, and the system for estimating point spread function as above.

BRIEF DESCRIPTION OF THE DRAWINGS

To clearly illustrate technical solutions in related art and in embodiments of the present disclosure, descriptions are made to the solutions, taken in conjunction with the accompanying drawings. Notably, the accompanying drawings described below are embodiments of the present disclosure, and for those skilled in the art, other drawings can be conceived without any creative work.

DETAILED DESCRIPTION OF ILLUSTRATIVE IMPLEMENTATIONS

To clearly illustrate the objectives, technical solutions and advantages of the embodiments of the disclosure, descriptions are made clearly and completely to the embodiments of the disclosure in details by reference to the accompanying drawings therein. Notably, the following drawings are some embodiments of the disclosure, and the skilled in the related art may conceive other embodiments without any creative works, which are all fall within the protection scope of the present disclosure.

Figure 1:
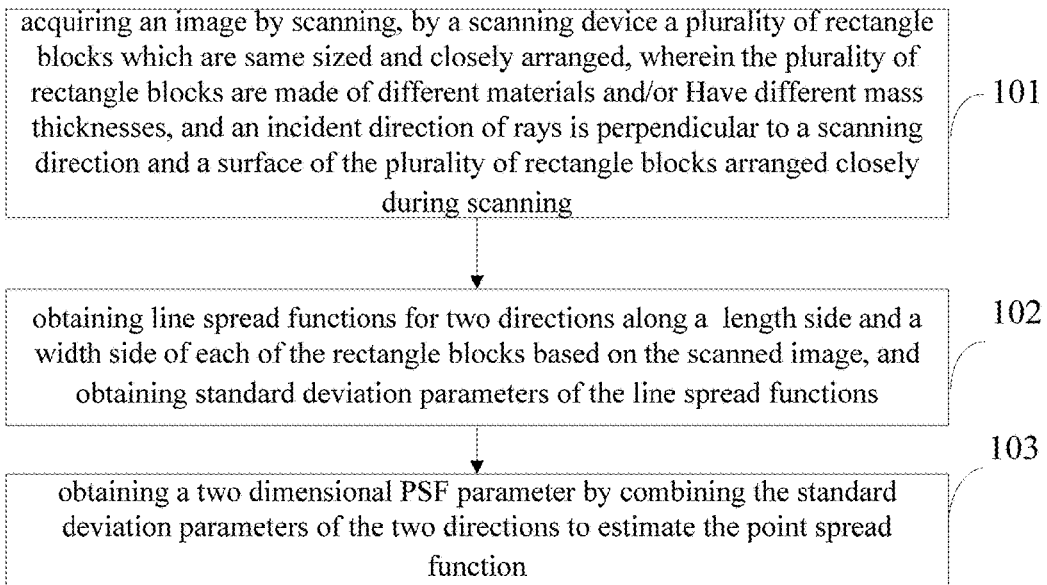
FIG. 1 is a basic flow diagram showing a method for estimating PSF according to an embodiment of the disclosure.

A method for estimating a PSF is provided according to an embodiment of the disclosure, as shown in FIG. 1. The method includes the following steps.

Step 101: an image is captured by scanning a plurality of rectangle blocks which are same sized and closely arranged using a scanning device. The plurality of rectangle blocks may be made of different materials and/or have different mass thicknesses. The incident direction of rays is perpendicular to a scanning direction and a surface of the plurality of rectangle blocks arranged closely during scanning;

Step 102: line spread functions (LSFs) are obtained for two directions along a length side and a width side of each of the rectangle blocks based on the scanned image, and standard deviation parameters of the line spread functions are obtained.

Step 103: the standard deviation parameters for the two directions are combined to obtain a two dimensional PSF parameter so as to estimate the PSF.

In some embodiments, the length side and/or width side of each of the rectangle blocks has a size that not less than a predetermined multiple of size of a detector in the scanning device, for example, 5~100 times The size of the detector refers to an effective size of the detector for collecting X-rays.

In some embodiments, obtaining LSFs for two directions of each of the rectangle blocks based on the scanned image may include: determining, with respect to both the two directions, positions of boundaries between every two rectangle blocks based on the number and arrangement of the rectangle blocks, computing cumulative gray level transformation curves for the boundaries in two directions, and obtaining the LSFs for the two directions by applying a differential calculation to the cumulative gray level transformation curves.

In some embodiments, obtaining the standard deviation parameters of the LSFs may include: applying Gaussian fitting to the LSFs of the two directions in order to obtain the standard deviation parameters of the line spread functions.

In some embodiments, after obtaining the standard deviation parameters of the LSFs and before combining the standard deviation parameters of the two directions, the method may include: obtaining an average standard deviation parameter for the two directions by averaging multiple LSF parameters in the same direction in accordance with the materials and the mass thicknesses of the rectangle blocks.

Figure 2:
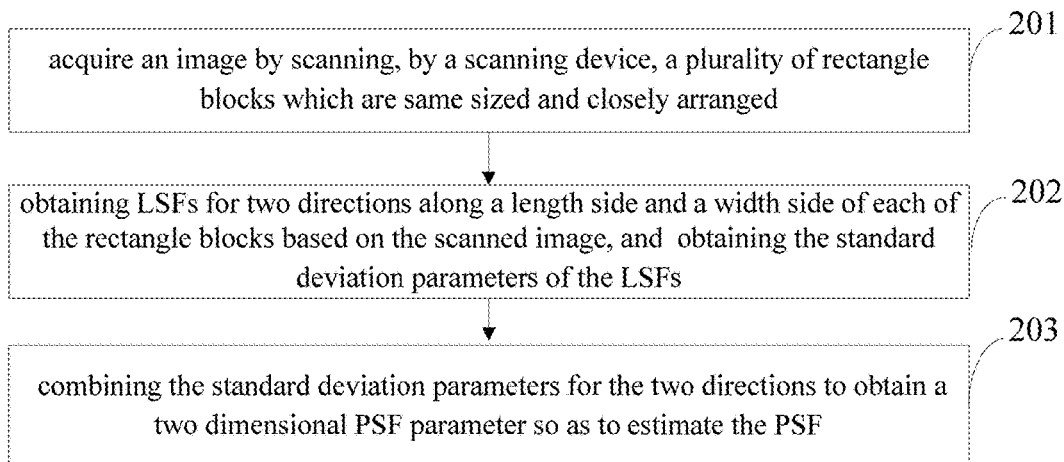
FIG. 2 is a schematic diagram showing an exemplary flow of a method for estimating PSF according to an embodiment of the disclosure.

FIG. 2 is a schematic diagram showing an exemplary flow of a method for estimating a PSF according to an embodiment of the disclosure. In the method, a plurality of rectangle blocks which are uniform tabular materials with similar sized and having different mass thicknesses are used. As shown in FIG. 2, the method includes the following steps.

Step 201: an image is captured by scanning a plurality of rectangle blocks which are same sized and closely arranged using a scanning device.

Figure 3:
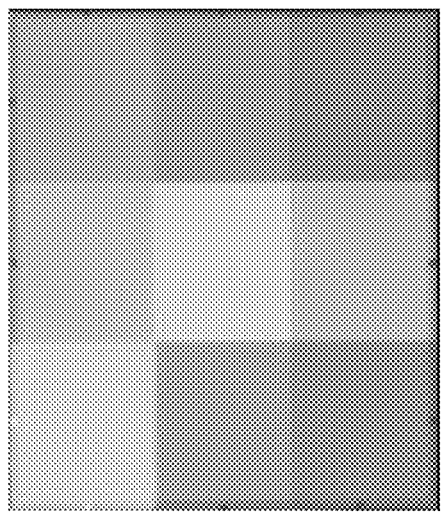
FIG. 3 is a schematic diagram showing a scanned image of rectangle blocks according to an embodiment of the disclosure.

At step 201, a plurality of rectangle blocks made of Iron or Polyethylene with different mass thickness are scanned for image formulation. The scanned image is shown in FIG. 3. The size of each rectangle block is 200 mm×200 mm. The rectangle blocks in the first row are iron blocks with mass thicknesses of 6 g/cm$^2$, 8 g/cm$^2$, 10 g/cm$^2$ respectively. The first rectangle block in the second row is an iron block with mass thickness of 4 g/cm$^2$, and the second and third rectangle blocks in the second row are polyethylene blocks with mass thicknesses of 2 g/cm$^2$ and 4 g/cm$^2$ respectively. The first rectangle block in the third row is an iron block with mass thickness of 3 g/cm$^2$, and the second and third rectangle blocks in the third row are polyethylene blocks with the mass thicknesses of 6 g/cm$^2$ and 8 g/cm$^2$ respectively. This fixed material of blocks arranged closely is placed in the scanning device with its surface being perpendicular to the incident direction of rays so that a scanned image can be obtained. The scanning direction is parallel to the horizontal sides of the rectangle blocks shown in FIG. 3.

Step 202: LSFs are obtained for two directions along a length side and a width side of each of the rectangle blocks based on the scanned image, and standard deviation parameters of the LSFs are obtained.

Figure 4:
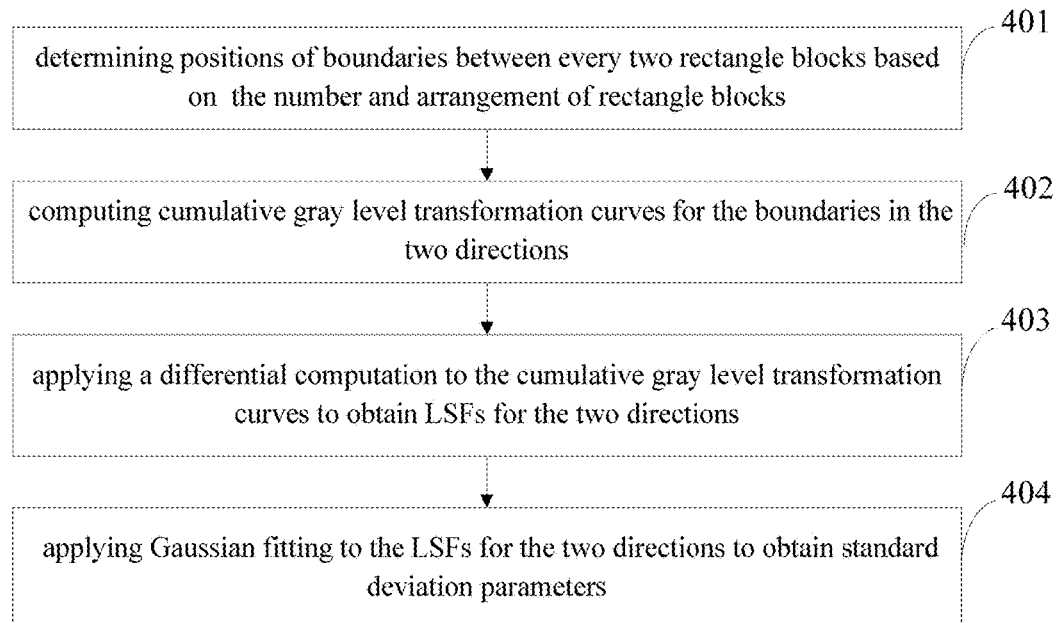
FIG. 4 is a schematic diagram showing an execution flow of step 202 in FIG. 1 according to an embodiment of the disclosure.
Figure 5:
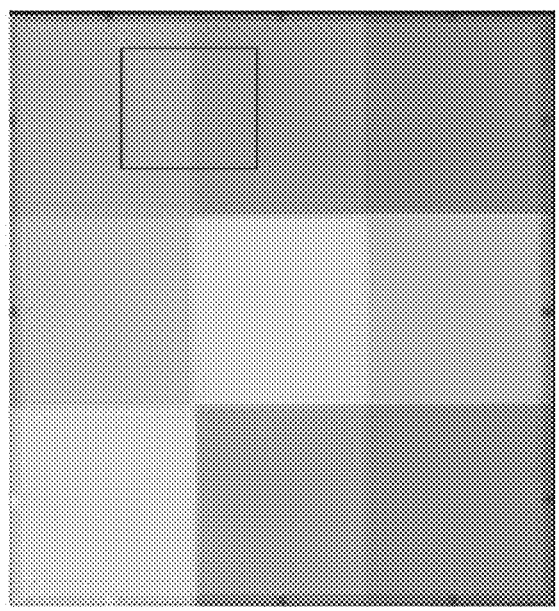
FIG. 5 is a schematic diagram showing an area for which a cumulative gray level transformation curve of a vertical direction is computed according to an embodiment of the disclosure.
Figure 6:
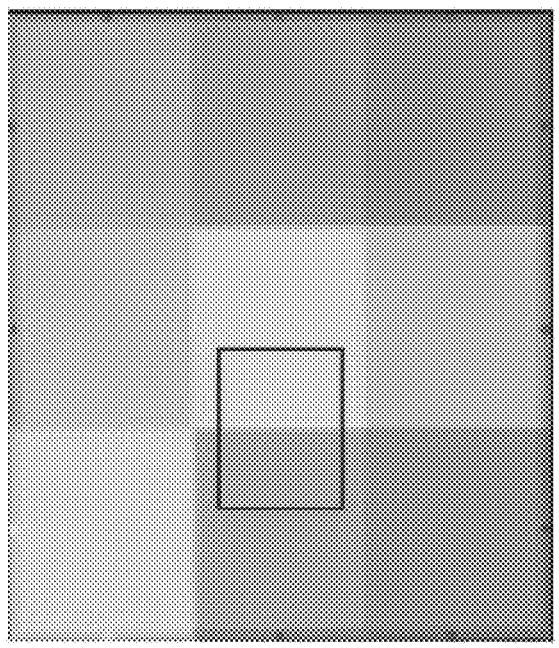
FIG. 6 is a schematic diagram showing an area for which a cumulative gray level transformation curve of a horizontal direction is computed according to an embodiment of the disclosure.
Figure 7:
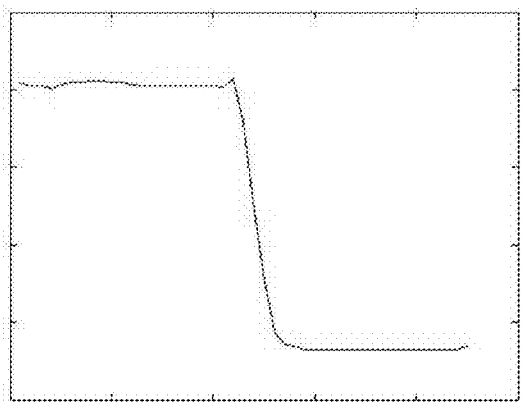
FIG. 7 is a cumulative gray level transformation curve computed for the area shown in FIG. 5 according to an embodiment of the disclosure.
Figure 8:
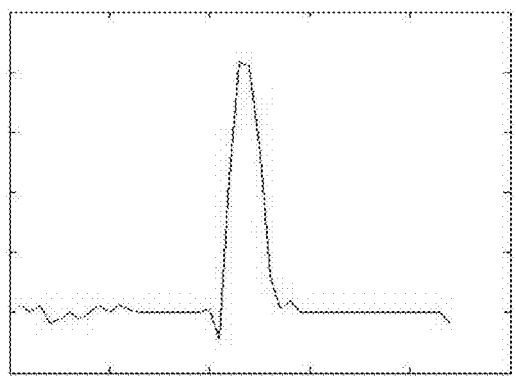
FIG. 8 is a schematic diagram showing a LSF curve obtained by applying a differential calculation to the cumulative gray level transformation curve shown in FIG. 7 according to an embodiment of the disclosure.

The execution flow of step 202 is shown in FIG. 4. As shown, at step 401, positions of the boundaries between every two rectangle blocks can be determined by a simple computation based on the information about the numbers of rectangle blocks in every row and column. Next, at step 402, for each boundary, a cumulative gray level transformation curve is computed for a rectangle area around the boundary and centered on the midpoint of the boundary. For example, the computing area of the vertical boundary between the first and the second blocks of the first top row shown in FIG. 5 and the computing area of the horizontal boundary between the second block of the middle row and the second block of the lower row shown in FIG. 6 may be selected, to obtain the cumulative gray level transformation curves corresponding to the vertical and the horizontal directions respectively by accumulating along the trend of the respective boundaries. And then the LSFs for the two directions can be obtained in step 403. For example, the cumulative gray level transformation curve computed for the computing area shown in FIG. 5 is shown in FIG. 7. An approximate derivative is computed by applying a first order differential calculation to the curve to obtain an approximate LSF curve as shown in FIG. 8. In the differential calculation, the gray level values of the both ends of the gray level transformation curve are used to determine whether a forward differential calculation or a backward differential calculation should be employed (the forward differential calculation f(x)−f(x−1) is employed if the gray level value on the left is smaller, otherwise the backward differential f(x)−f(x+1) is employed), in order to ensure most differential values are positive.

Figure 9:
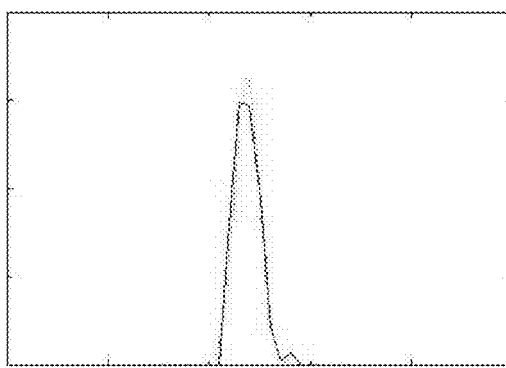
FIG. 9 is a schematic diagram showing a curve after noise removal of the LSF curve shown in FIG. 8 (solid line) and a resulted curve of Gaussian Fitting (dashed line) according to an embodiment of the disclosure.

After obtaining the LSFs for the two directions at step 403, the LSF curve is searched for a negative or zero value from its maximum value to both sides, and when a negative or zero value is found, all the values thereafter are set to zeros, in order to obtain a LSF curve having noises eliminated. After eliminating noises, the LSF curve shown in FIG. 8 may be changed to the solid line shown in FIG. 9. At step 404, a standard deviation parameter of the LSF may be obtained by applying Gaussian fitting to the solid line shown in FIG. 9 and computing its average value and standard deviation. The result of the fitting is shown as the dotted line in FIG. 9.

Step 203: A two dimensional PSF parameter may be obtained by combining the standard deviation parameters of the two directions so as to estimate the PSF.

At this step, the distribution of the PSF may be estimated as below by combining the standard deviation parameters of the vertical and horizontal directions (i.e., x and y):

$$h(x, y) = \frac{1}{C}\exp\left(-\frac{x^2}{2\sigma_x^2} + \frac{y^2}{2\sigma_y^2}\right)$$

wherein C is a normalized coefficient, $\sigma_x$ and $\sigma_y$ are the standard deviation parameters of the x direction and y direction respectively.

Figure 10:
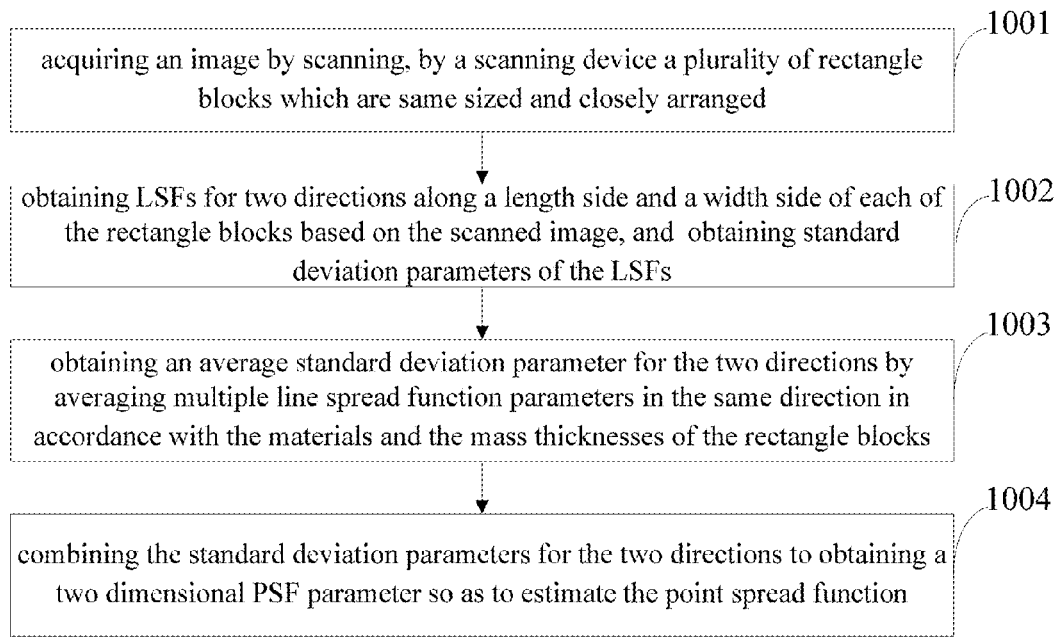
FIG. 10 is an exemplary flow diagram showing a method for estimating PSF according to an embodiment of the disclosure.

FIG. 10 is an exemplary flow diagram showing a method for estimating a PSF according to an embodiment of the disclosure. Referring to FIG. 10, the method for estimating the PSF of the present embodiment is basically the same as that discussed with respect to FIG. 2 In the method, before step 1004 which is corresponding to step 203 of FIG. 2, it may include: step 1003 where average standard deviation parameters for the two directions may be obtained by averaging multiple LSF parameters in the same direction in accordance with the materials and the mass thicknesses of the rectangle blocks.

At this step, vertical and horizontal average standard deviations may be obtained by averaging the standard deviation parameters of the respective two directions after the foregoing LSF computation and standard deviation fitting steps for all the 6 inner vertical boundaries and all the 6 inner horizontal boundaries of the blocks.

Correspondingly, at step 1004, the standard deviation parameters $\sigma_x$ and $\sigma_y$ of the x direction and y direction may be replaced with the average standard deviation parameters of the x direction and y direction respectively.

Figure 11:
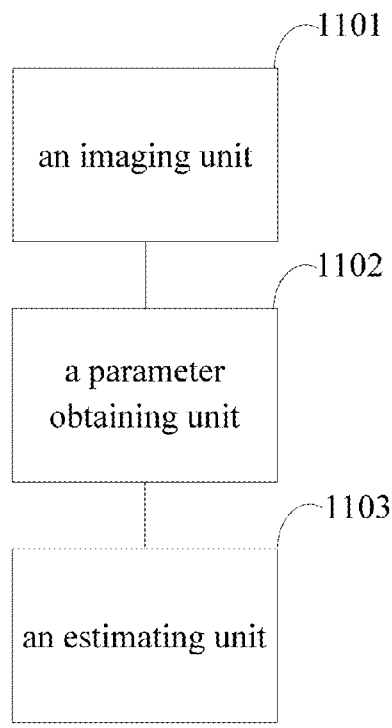
FIG. 11 is a basic structure diagram showing a system for estimating PSF according to an embodiment of the disclosure.

FIG. 11 is a basic structure diagram showing a system for estimating PSF according to an embodiment of the disclosure. As shown in FIG. 11, the system includes: an imaging unit 1101 configured to acquire an image by scanning a plurality of rectangle blocks which are same sized and closely arranged using a scanning device, wherein the plurality of rectangle blocks are made of different materials and/or have different mass thicknesses, and an incident direction of rays is perpendicular to a scanning direction and a surface of the plurality of rectangle blocks arranged closely during scanning; a parameter obtaining unit 1102 configured to obtain LSFs of two directions along a length side and a width side of each of the rectangle blocks based on the scanned image, and obtain standard deviation parameters of the LSFs; and an estimating unit 1103 configured to combine the standard deviation parameters of the two directions to obtain a two dimensional PSF parameter so as to estimate the point spread function.

The size of the length side and the width side of each of the rectangle block is not less than a predetermined multiple of size of a detector in the scanning device.

The parameter obtaining unit 1102 may be further configured to determine positions of boundaries between every two rectangle blocks based on the number and arrangement of the rectangle blocks, compute cumulative gray level transformation curves for the boundaries in two directions, and obtain the LSFs of the two directions by applying a differential calculation to the cumulative gray level transformation curves.

The parameter obtaining unit 1102 may be further configured to obtain the standard deviation parameters of the LSFs by applying Gussian fitting to the LSFs of the two directions.

The system may further include an averaging unit connected with the parameter obtaining unit and the estimating unit respectively and configured to obtain an average standard deviation parameter of each of the two directions by averaging multiple LSF parameters in the same direction in accordance with the materials and the mass thicknesses of the rectangle blocks.

The method and system described above may be used in an image processing method and image processing system of an X-ray imaging system, to determine imaging quality of an X-ray imaging device or restore images.

Specifically, after the estimated PSF is obtained, a predetermined pixel range threshold may be used to determine whether the acquired image is clear or whether imaging quality meets requirements. The pixel range of the PSF may be small when the acquired image is clear, for example, 3*3 pixels; and the pixel range of the PSF may be relatively large when the imaging quality is low, for example, 7*7 pixels.

In addition, when the quality of the acquired image is less than satisfactory, the obtained PSF may be used to operate with the acquired image to restore the image with higher quality and thereby improve the imaging quality. There are many ways for image restoration, for example, deconvolution operation, which may perform a deconvolution to the acquired image with the PSF, to obtain a better image.

Figure 12:
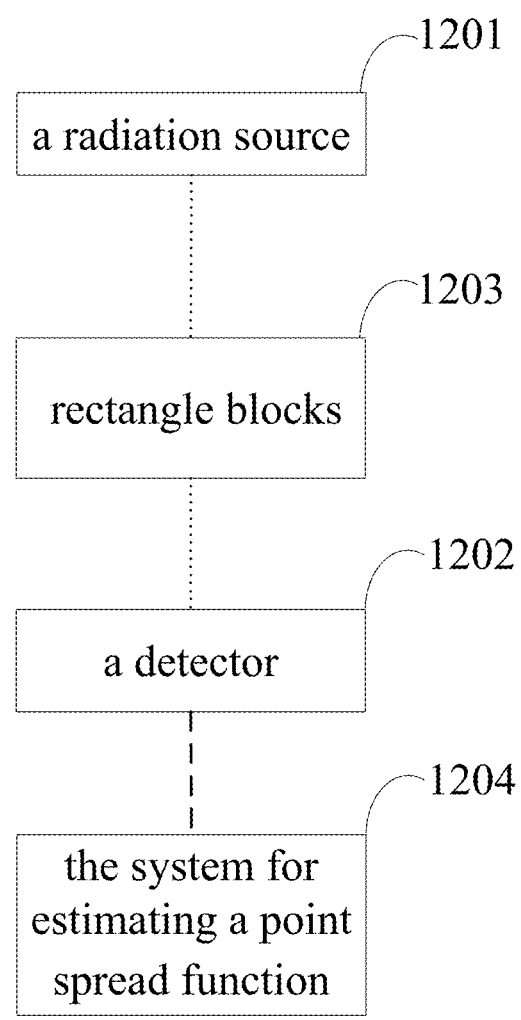
FIG. 12 is a structure diagram showing an image processing system for an X-ray imaging device according to an embodiment of the disclosure.

FIG. 12 is a structure diagram showing an imaging processing system for an X-ray imaging device according to an embodiment of the disclosure. As shown in FIG. 12, the system includes: a radiation source 1201, a detector 1202, and rectangle blocks 1203 and the system for estimating a PSF 1204 as described above.

The radiation source 1201 emits X-rays to the plurality of rectangle blocks 1203 arranged closely, the detector 1202 collects signals, and the system for estimating a PSF 1204 analyzes the collected signals to estimate a PSF.

In some embodiments, each of the rectangle blocks may be made of one of Graphite, Lead, Iron and Polyethylene.

In some embodiments, the mass thickness of each of the rectangle block may be 2~50 g/cm$^2$.

In some embodiments, the size of a length side and/or a width side of each of the rectangle block may be 5~100 times of an effective size of the detector for collecting X-rays.

The method and system for estimating a SPF provided in the embodiments of the disclosure provide a way to estimate a PSF automatically and quickly without having knowledge of the size and mass thickness of each of the rectangle blocks and the size of the detector. The quantitative description of the PSF obtained by the estimation of the disclosure can be used to give a quantitative evaluation on imaging quality of the scanning device, and thereby a restoration technical can be used to deblur the image so as to improve the definition of the image. In addition, a corresponding suggestion can be presented to improve the hardware of the scanning system based on the PSF parameters. The method and system of the disclosure are suitable to various scanning system for estimating a PSF, especially a PSF that may be approximated as a Gaussian shape and has different standard deviations with respect to the two directions. In summary, the method and system for estimating a PSF provided in the embodiments of the disclosure may achieve the following effects:

(1) Simple usage and high level of automation. It only requires that the plurality of rectangle blocks have same size and each block has uniform thickness, with no precise requirement for specific thickness and size, which may reduce production requirements. Further, except for image scanning, it can automatically complete the processes, such as area location, parameter computation and the like without any human intervention;

(2) High robustness and adaptive ability. It comprehensively utilizes the step edges of multiple areas, which reduces influence by noises. Further, it requires only that the plurality of rectangle blocks have the same size and each block has uniform thickness, and the numbers of the rectangle blocks in both directions are known, with no precise requirement for specific thickness and size, which may reduce requirements for physical processing precision, such as thickness and size of the material, etc.

(3) High processing speed. The processing speed can be dramatically improved since the PSF may be approximate to a Gaussian shape and there is no too many deconvolution operations.

It should be noted that the above embodiments are exemplary and explanatory only, and are not restrictive of the present disclosure. Those skilled in the art will appreciate that even though the specific descriptions are made with reference to the forgoing embodiments, any modifications, equivalent alternations and improvements could be made to the above embodiments without departing from the scope and spirit of the disclosure.

What is claimed is:

1. A method for estimating a point spread function, the method comprising:
    capturing, by a scanning device, an image by scanning a plurality of rectangle blocks which are same sized and closely arranged, wherein the plurality of rectangle blocks are made of different materials and/or have different mass thicknesses, and an incident direction of rays is perpendicular to a scanning direction and a surface of the plurality of rectangle blocks arranged closely during scanning;
    obtaining line spread functions for two directions along a length side and a width side of each of the rectangle blocks based on the scanned image, and obtaining standard deviation parameters of the line spread functions; and
    combining the standard deviation parameters for the two directions to obtain a two dimensional Point Spread Function (PSF) parameter so as to estimate the point spread function.

2. The method of claim 1, wherein size of the length side and width side of each of the rectangle blocks is not less than a predetermined multiple of size of a detector in the scanning device.

3. The method of claim 1, wherein said obtaining the line spread functions further comprises:
    determining, for the two directions, positions of boundaries between every two rectangle blocks based on the number and arrangement of the rectangle blocks;
    computing cumulative gray level transformation curves for the boundaries in two directions; and
    obtaining the line spread functions for the two directions by applying a differential calculation to the cumulative gray level transformation curves.

4. The method of claim 1, wherein said obtaining the standard deviation parameters of the line spread functions comprises:
    applying Gaussian fitting to the line spread functions for the two directions in order to obtain the standard deviation parameters of the line spread functions.

5. The method of claim 1, wherein after obtaining the standard deviation parameters of the line spread functions and before combining the standard deviation parameters for the two directions, the method further comprising:
    obtaining an average standard deviation parameter of each of the two directions by averaging multiple line spread function parameters in the same direction in accordance with the materials and the mass thicknesses of the rectangle blocks.

6. A system for estimating a point spread function, the system comprising:
    a scanning device positioned and configured to capture an image by scanning a plurality of rectangle blocks which are same sized and closely arranged, wherein the plurality of rectangle blocks are made of different materials and/or have different mass thicknesses, and an incident direction of rays is perpendicular to a scanning direction and a surface of the plurality of rectangle blocks arranged closely during scanning; and
    at least one processor configured to obtain line spread functions for two directions along a length side and a width side of each of the rectangle blocks based on the scanned image, and obtain standard deviation parameters of the line spread functions;
    wherein the at least one processor is further configured to combine the standard deviation parameters for the two directions to obtain a two dimensional Point Spread Function (PSF) parameter so as to estimate the point spread function.

7. The system of claim 6, wherein size of the length side and width side of each of the rectangle blocks is not less than a predetermined multiple of size of a detector in the scanning device.

8. The system of claim 6, wherein the at least one processor is further configured to:
    determine, for the two directions, positions of boundaries between every two rectangle blocks based on the number and arrangement of the rectangle blocks;
    compute cumulative gray level transformation curves for the boundaries in two directions; and
    obtain the line spread functions of the two directions by applying a differential calculation to the cumulative gray level transformation curves.

9. The system of claim 6, wherein the at least one processor is further configured to:
    apply Gaussian fitting to the line spread functions of the two directions in order to obtain the standard deviation parameters of the line spread functions.

10. The system of claim 6, wherein the at least one processor is further configured to:
    obtain an average standard deviation parameter of each of the two directions by averaging multiple line spread function parameters in the same direction in accordance with the materials and the mass thicknesses of the rectangle blocks.

11. An image processing system for an X-ray imaging device, comprising a radiation source, a detector, rectangle blocks, and the system for estimating point spread function according to claim 6.

12. The image processing system for an X-ray imaging device of claim 11, wherein each of the rectangle blocks is made of one of: Graphite, Lead, Iron and Polyethylene.

13. The image processing system for an X-ray imaging device of claim 11, wherein the mass thickness of each of the rectangle blocks is 2to 50 g/cm$^2$, or about 2to about 50 g/cm$^2$.

14. The image processing system for an X-ray imaging device of claim 11, wherein the size of length side and/or width side of each of the rectangle blocks is 5 to 100 times of an effective size of the detector for collecting X-rays, or about 5 to about 100 times of an effective size of the detector for collecting X-rays.

15. The method of claim 4, wherein after obtaining the standard deviation parameters of the line spread functions and before combining the standard deviation parameters for the two directions, the method further comprising:
    obtaining an average standard deviation parameter of each of the two directions by averaging multiple line spread function parameters in the same direction in accordance with the materials and the mass thicknesses of the rectangle blocks.

16. The method of claim 15, wherein size of the length side and width side of each of the rectangle blocks is not less than a predetermined multiple of size of a detector in the scanning device.

17. The method of claim 3, wherein said obtaining the standard deviation parameters of the line spread functions comprises:
    applying Gaussian fitting to the line spread functions for the two directions in order to obtain the standard deviation parameters of the line spread functions.

18. The method of claim 3, wherein after obtaining the standard deviation parameters of the line spread functions and before combining the standard deviation parameters for the two directions, the method further comprising:
    obtaining an average standard deviation parameter of each of the two directions by averaging multiple line spread function parameters in the same direction in accordance with the materials and the mass thicknesses of the rectangle blocks.

19. The method of claim 5, wherein said obtaining the standard deviation parameters of the line spread functions comprises:
    applying Gaussian fitting to the line spread functions for the two directions in order to obtain the standard deviation parameters of the line spread functions.

20. The method of claim 3, wherein size of the length side and width side of each of the rectangle blocks is not less than a predetermined multiple of size of a detector in the scanning device.

* * * * *